(12) United States Patent
Eo et al.

(10) Patent No.: US 9,958,032 B2
(45) Date of Patent: May 1, 2018

(54) TRANSMISSION FOR VEHICLE

(71) Applicant: HYUNDAI MOTOR COMPANY, Seoul (KR)

(72) Inventors: Soon Ki Eo, Ansan-si (KR); Hyun Chul Kim, Suwon-si (KR); Chon Ok Kim, Yongin-si (KR); Chae Hong Lim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 278 days.

(21) Appl. No.: 14/819,132

(22) Filed: Aug. 5, 2015

(65) Prior Publication Data
US 2016/0298741 A1 Oct. 13, 2016

(30) Foreign Application Priority Data

Apr. 7, 2015 (KR) .......................... 10-2015-0048872

(51) Int. Cl.
*F16H 3/00* (2006.01)
*F16H 3/085* (2006.01)
*F16H 3/10* (2006.01)
*F16H 3/093* (2006.01)

(52) U.S. Cl.
CPC ............. *F16H 3/006* (2013.01); *F16H 3/085* (2013.01); *F16H 3/10* (2013.01); *F16H 2003/007* (2013.01); *F16H 2003/0931* (2013.01); *F16H 2200/0052* (2013.01)

(58) Field of Classification Search
CPC ......... F16H 2003/007; F16H 2003/008; F16H 2003/0803; F16H 2003/0815; F16H 2003/0935; F16H 2003/0938; F16H 37/021; F16H 61/688; F16H 4/006; F16H 4/095; F16H 4/10
USPC .................................. 74/330, 331, 333, 340
See application file for complete search history.

(56) References Cited

U.S. PATENT DOCUMENTS

| 9,453,558 | B2 * | 9/2016 | Wittkopp | ................ F16H 3/006 |
| 9,670,991 | B2 * | 6/2017 | Eo | ........................... F16H 3/006 |
| 2012/0000743 | A1 * | 1/2012 | Wittkopp | ................ F16H 3/006 192/219.1 |

(Continued)

FOREIGN PATENT DOCUMENTS

| JP | 2005-195115 | 7/2005 |
| JP | 2007-120549 A | 5/2007 |

(Continued)

*Primary Examiner* — Victor L MacArthur
*Assistant Examiner* — Joseph H Brown
(74) *Attorney, Agent, or Firm* — Brinks Gilson & Lione

(57) ABSTRACT

A transmission includes: a first input shaft selectively receiving power from an engine; a second input shaft continuously receiving power from the engine; a first output shaft arranged in parallel with the first input shaft and the second input shaft; a differential drawing power from the first output shaft and a second output shaft; a first shift unit providing desired gear shifts; a second shift unit to carry out duplicate gear shifts; and a one-way clutch to transmit power from the engine to the differential. In particular, the duplicate gear shifts has a gear ratio substantially identical to a gear ratio of one of the gear shifts made by the first shift unit, and the one-way clutch is arranged in a power transmission line for transmitting the power from the engine to the differential through the second shift unit.

10 Claims, 16 Drawing Sheets

(56) References Cited

U.S. PATENT DOCUMENTS

2013/0263682 A1* 10/2013 Eo .......................... F16H 3/006
                                                          74/331
2015/0285340 A1* 10/2015 Kim ....................... F16H 3/006
                                                          74/330

FOREIGN PATENT DOCUMENTS

| JP | 2013-119280 A | 6/2013 |
| JP | 2013-119882 | 6/2013 |
| KR | 10 2012 00433 | 5/2012 |

* cited by examiner

[Fig. 1]
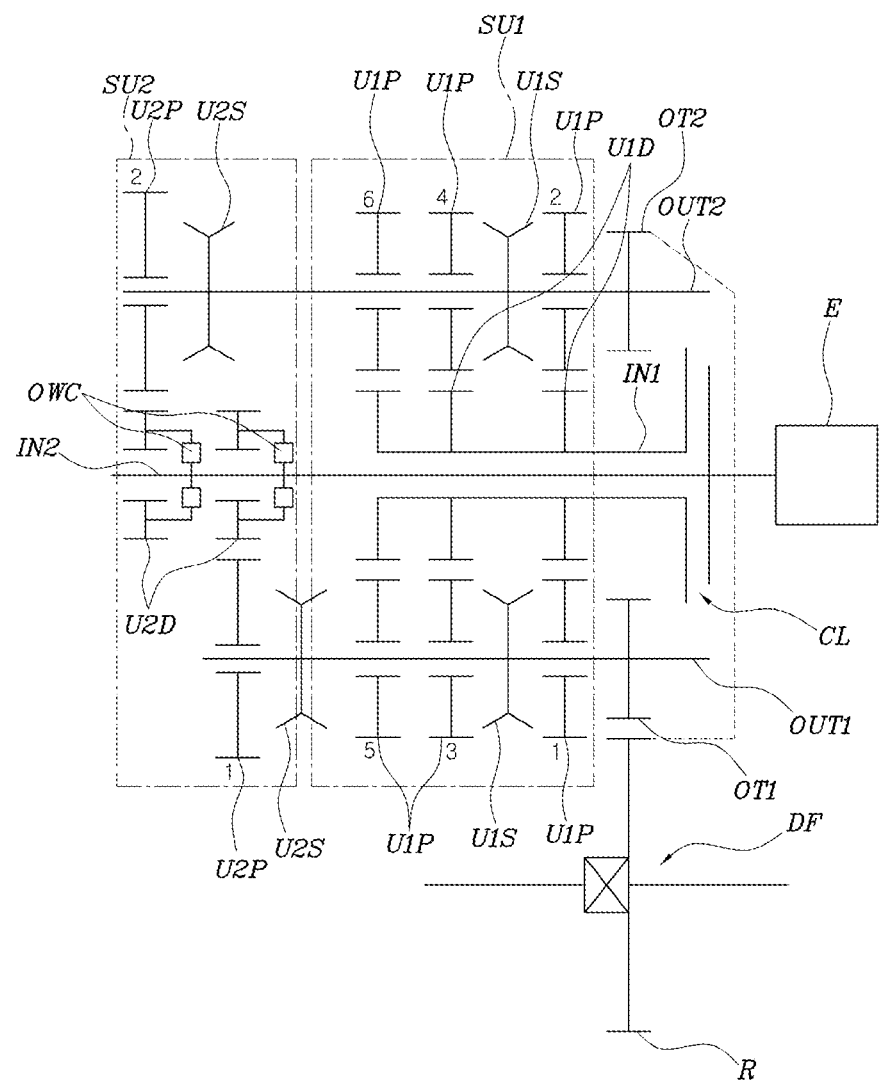

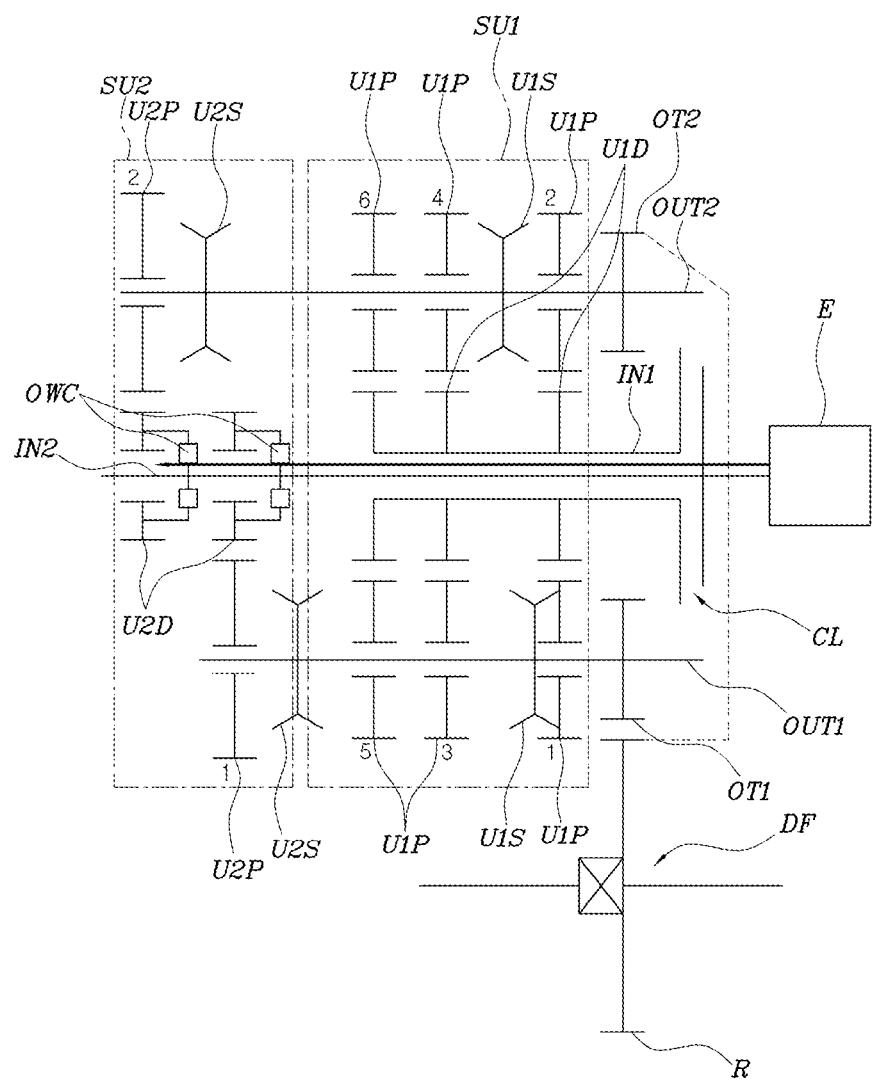
[Fig. 2]

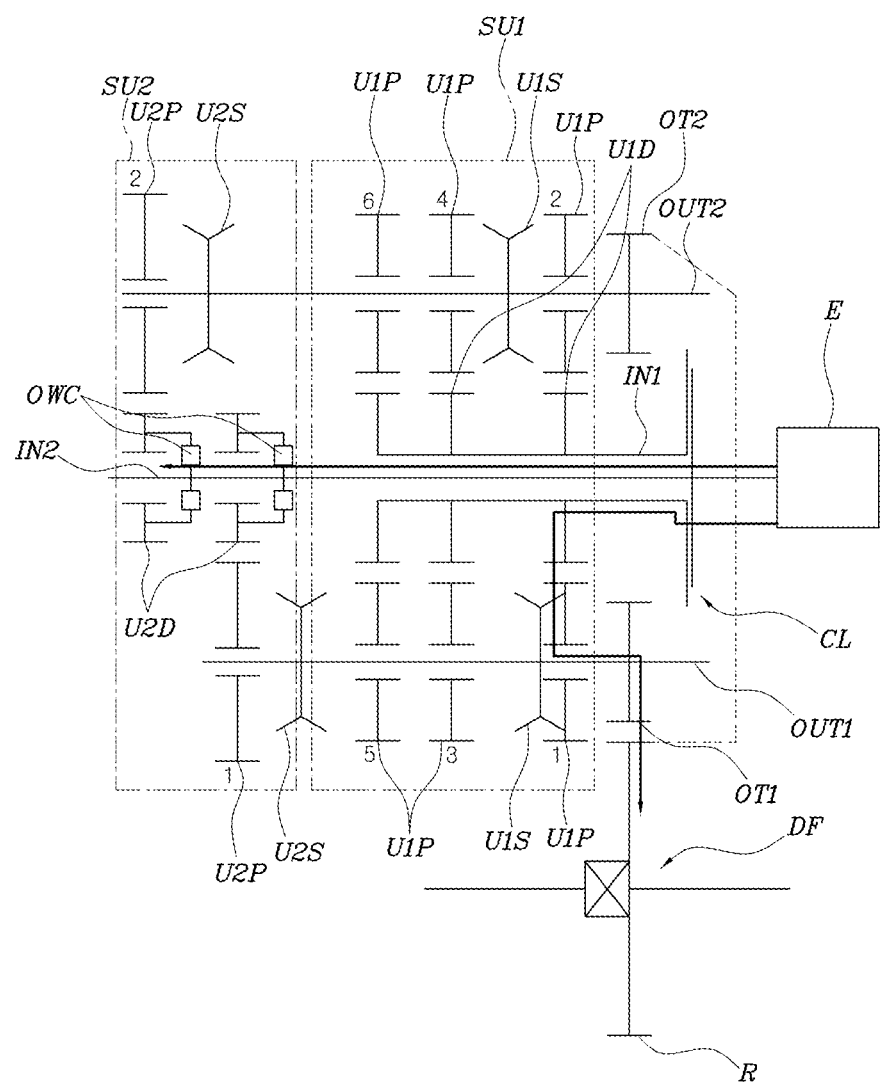
[Fig. 3]

[Fig. 4]
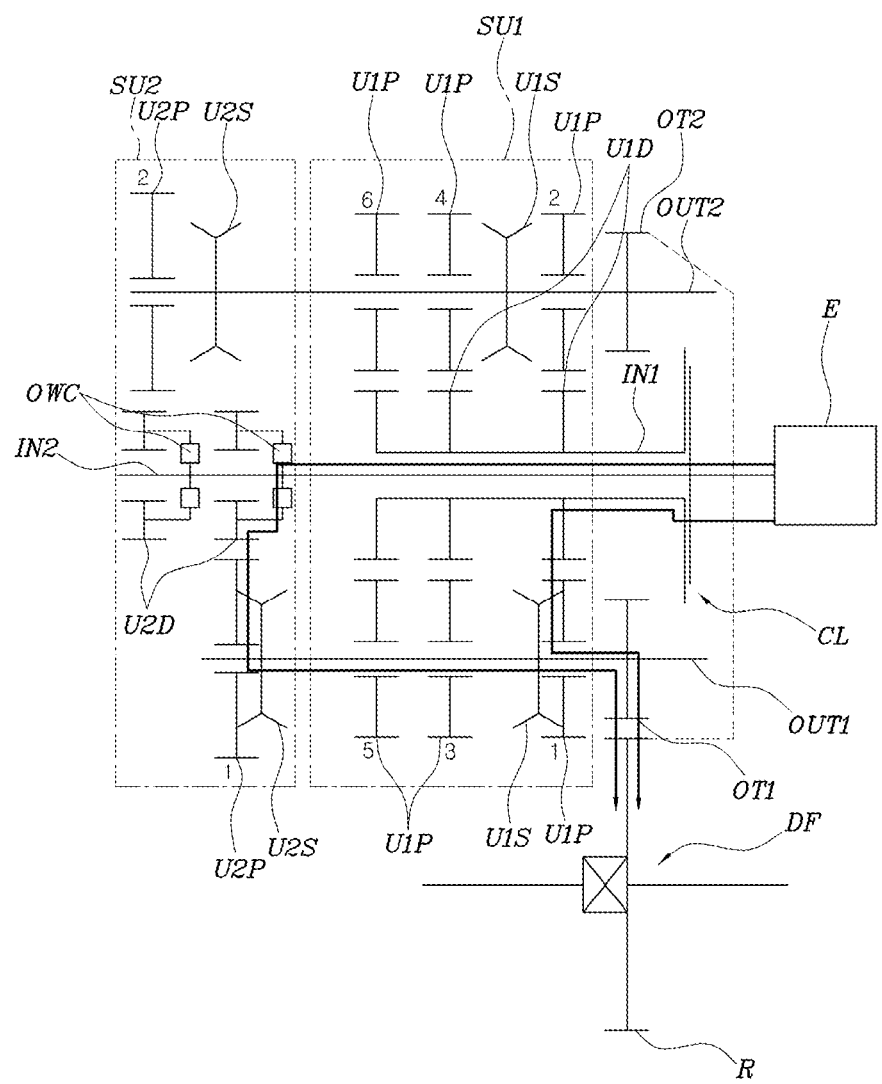

[Fig. 5]
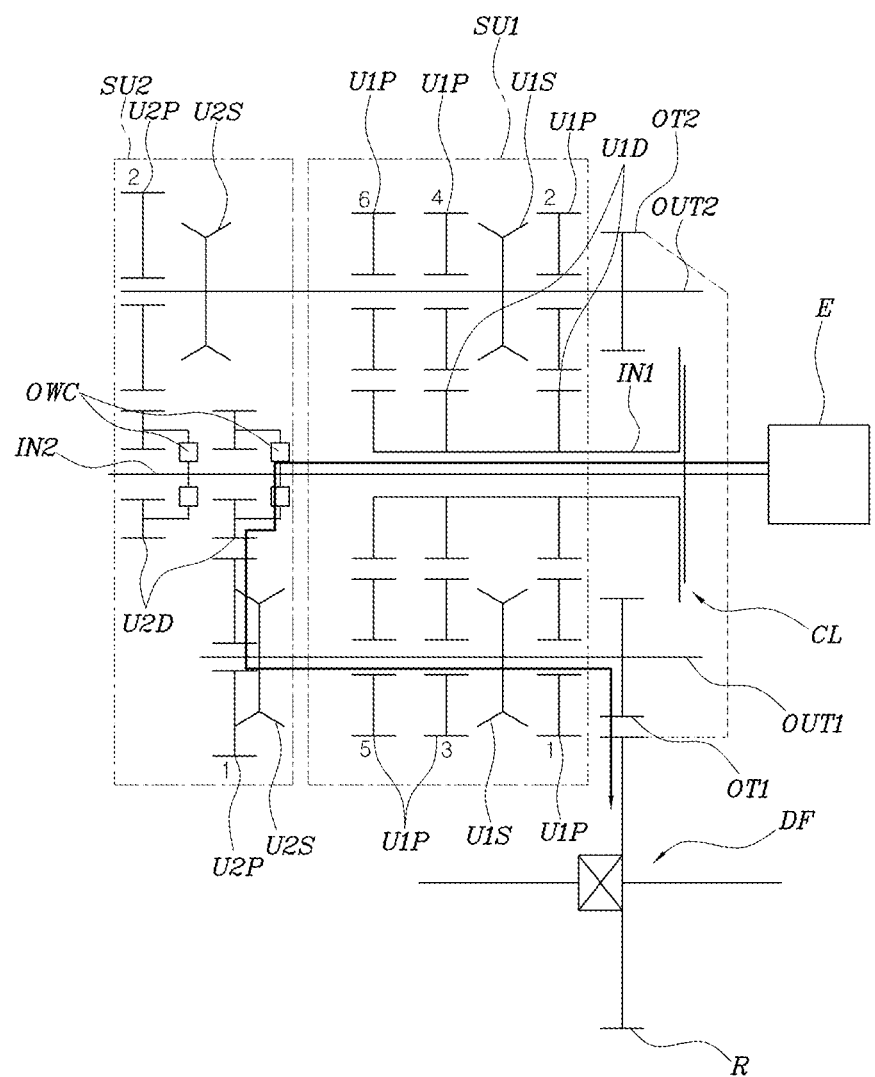

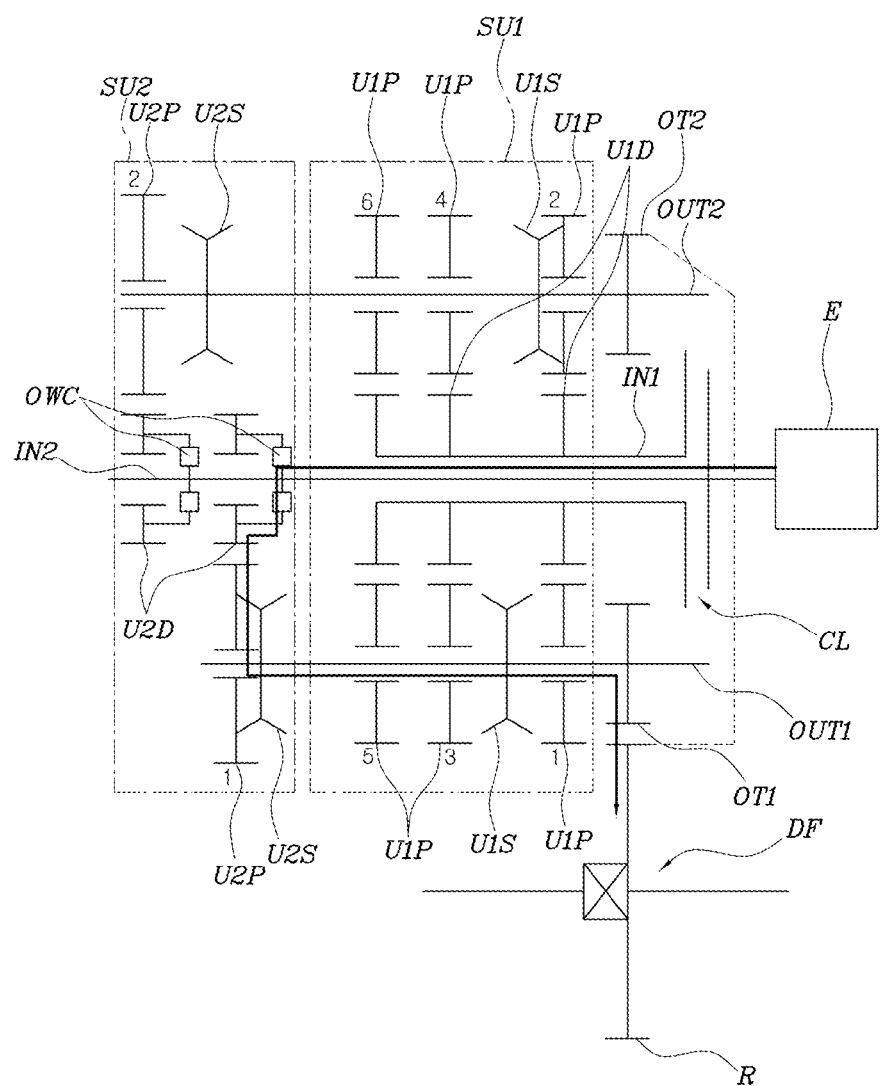
[Fig. 6]

[Fig. 7]
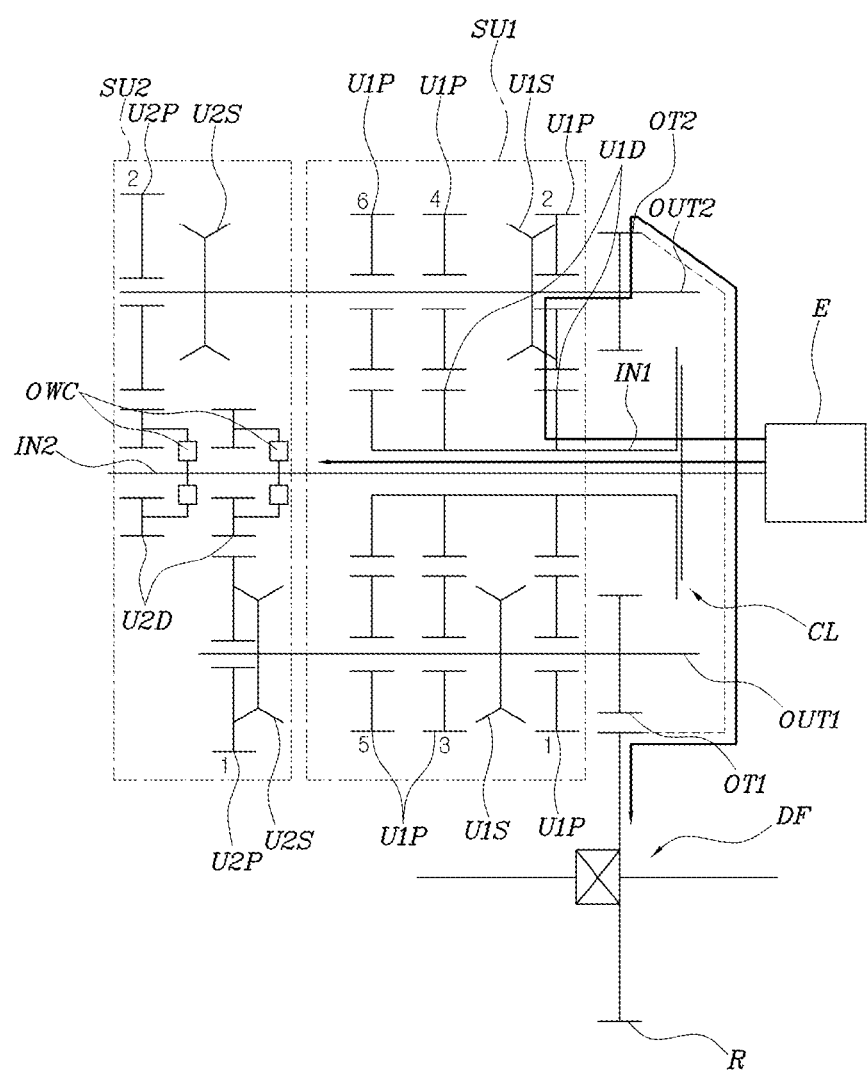

[Fig. 8]
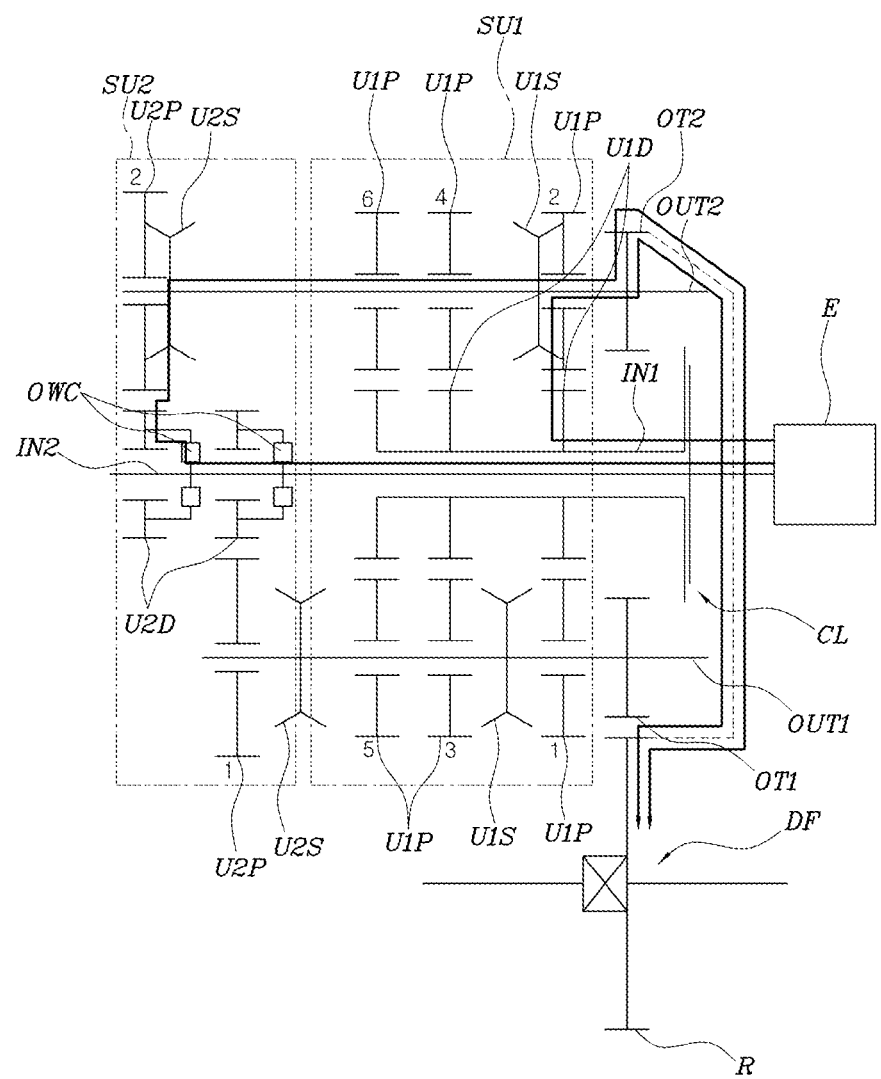

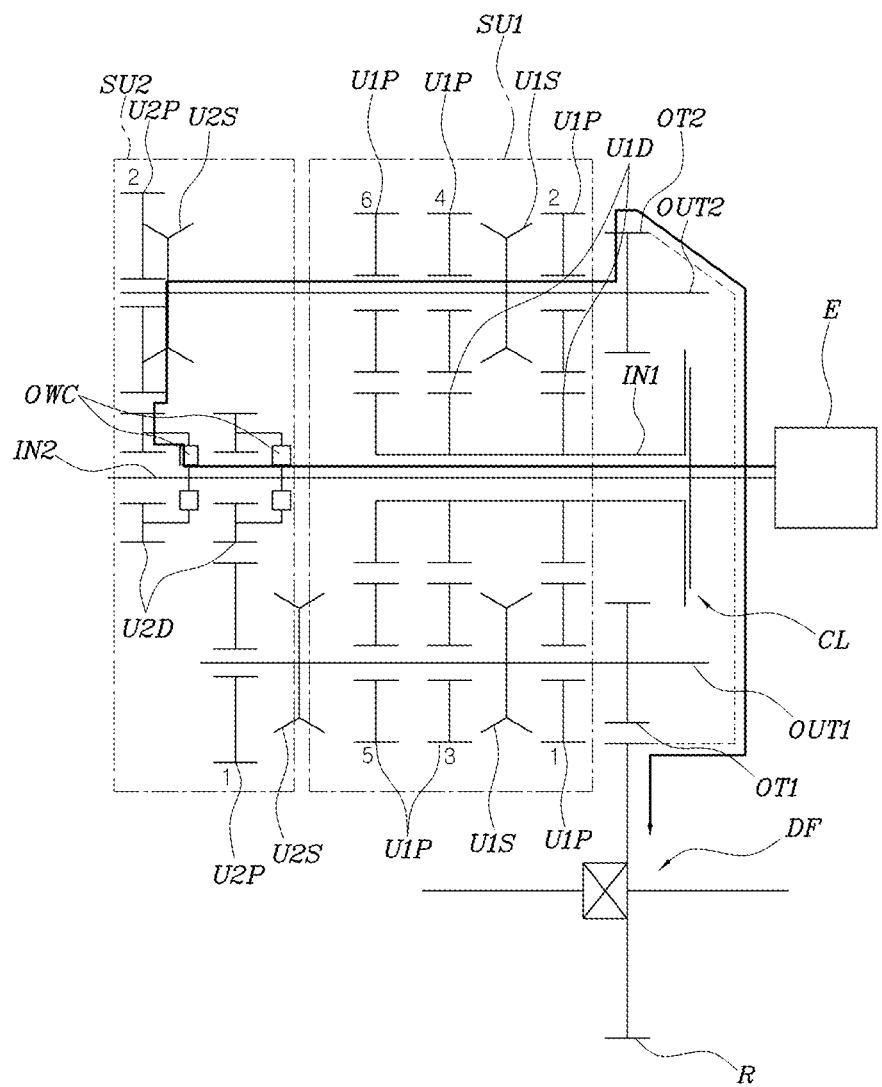
[Fig. 9]

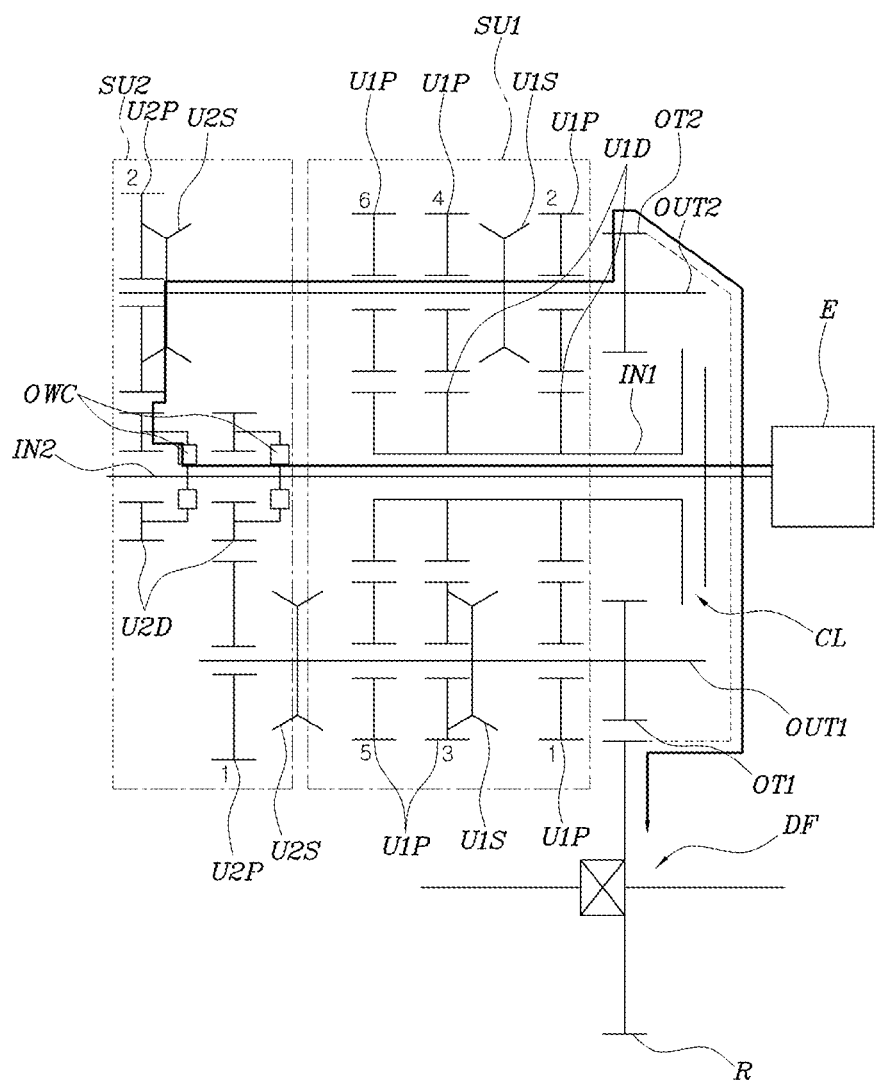
[Fig. 10]

[Fig. 11]
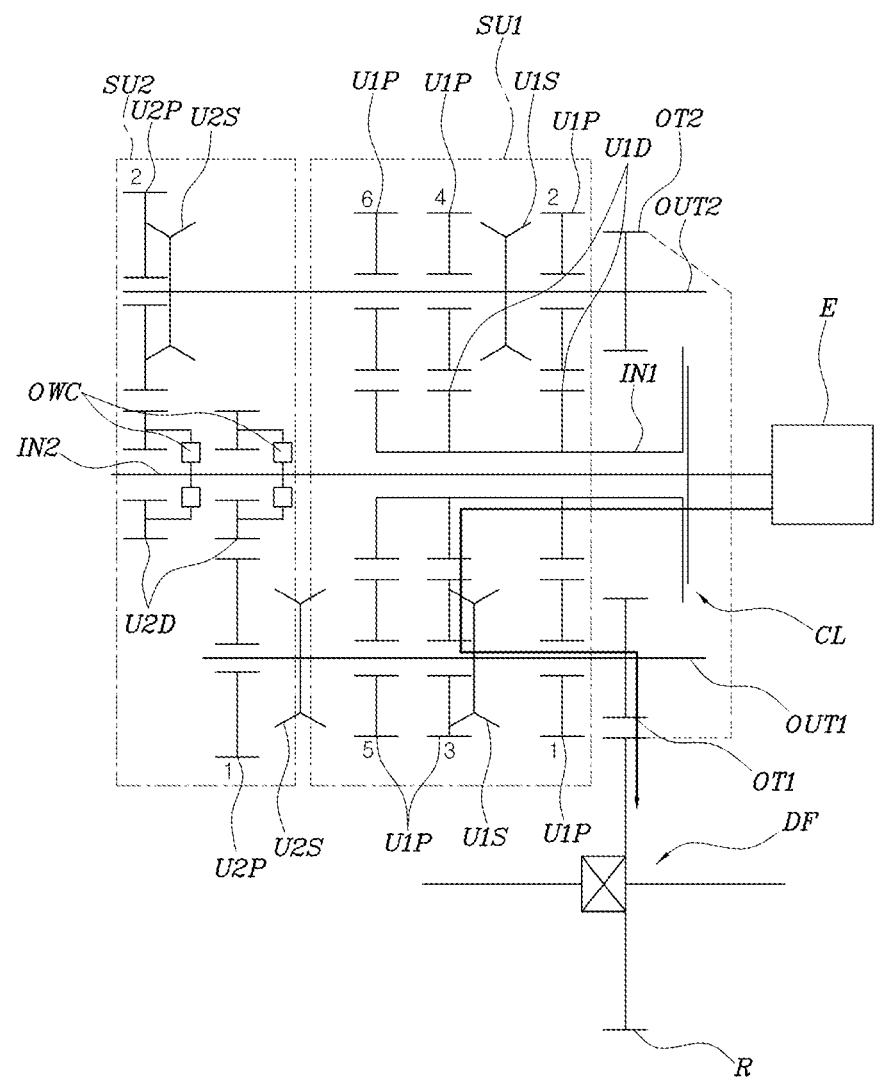

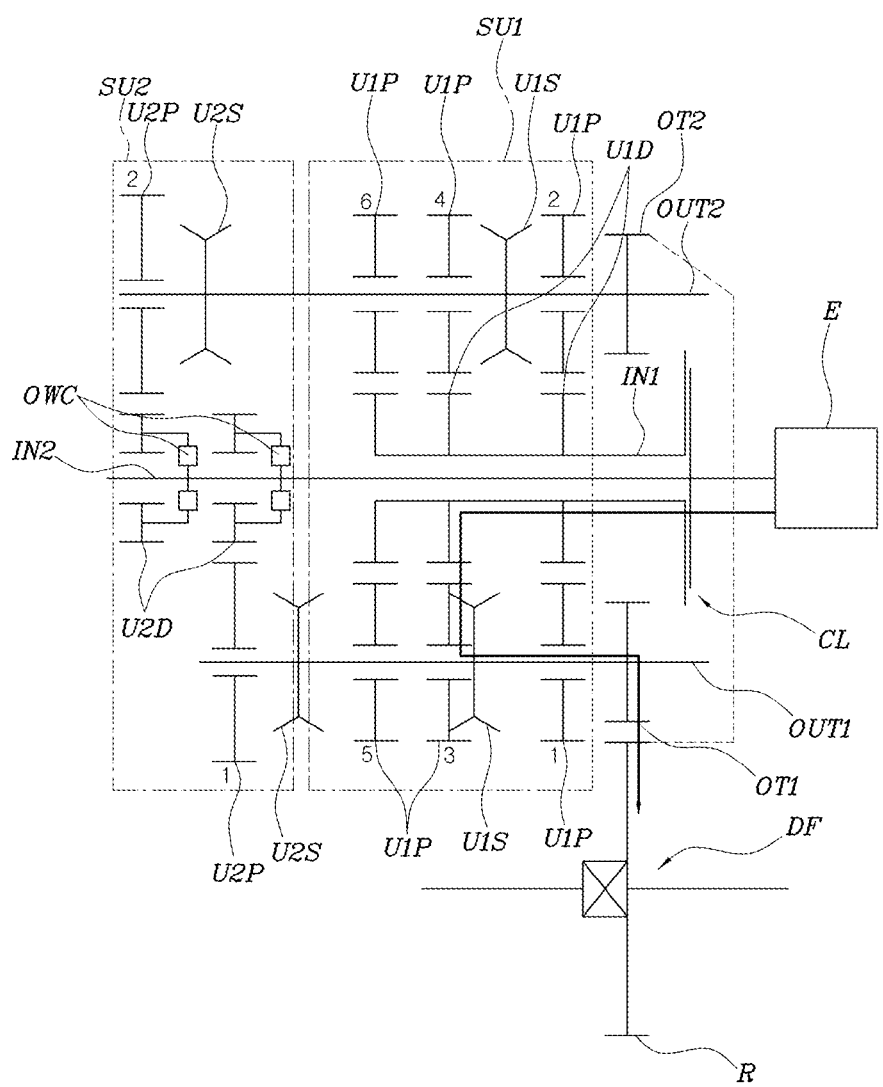
[Fig. 12]

[Fig. 13]
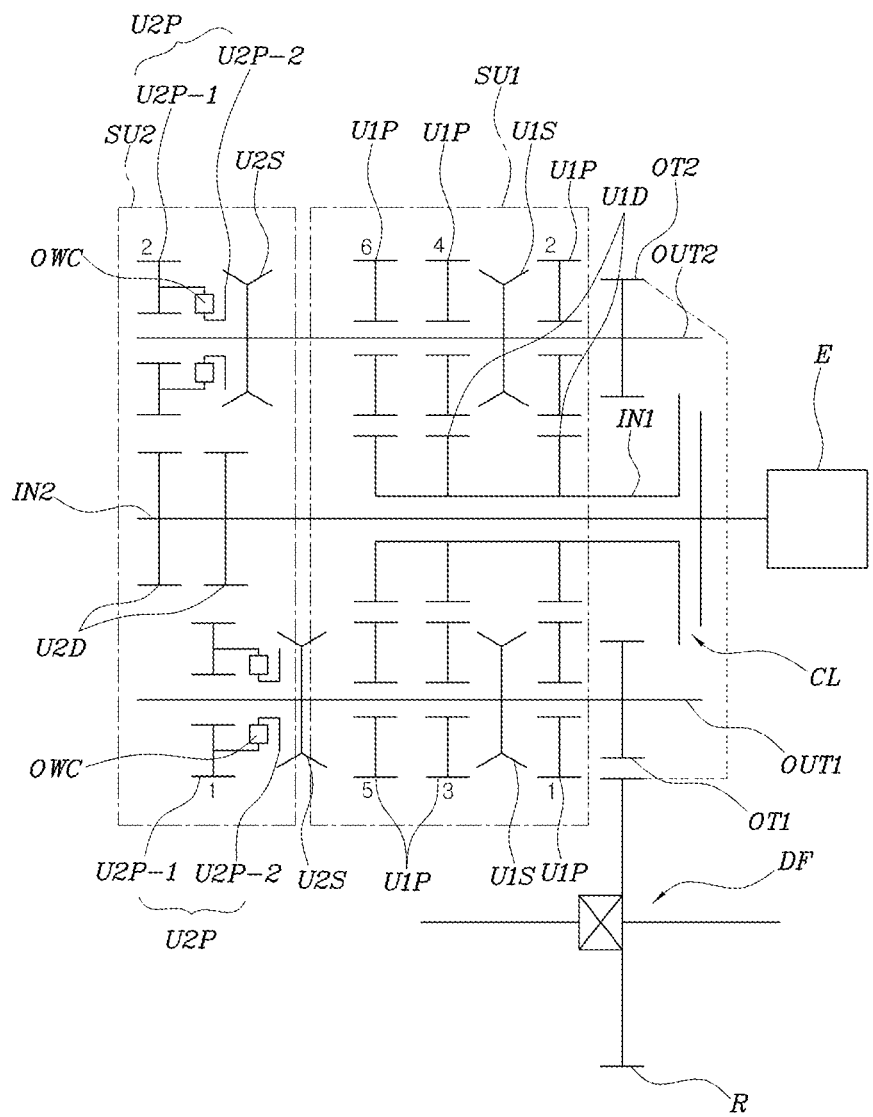

[Fig. 14]
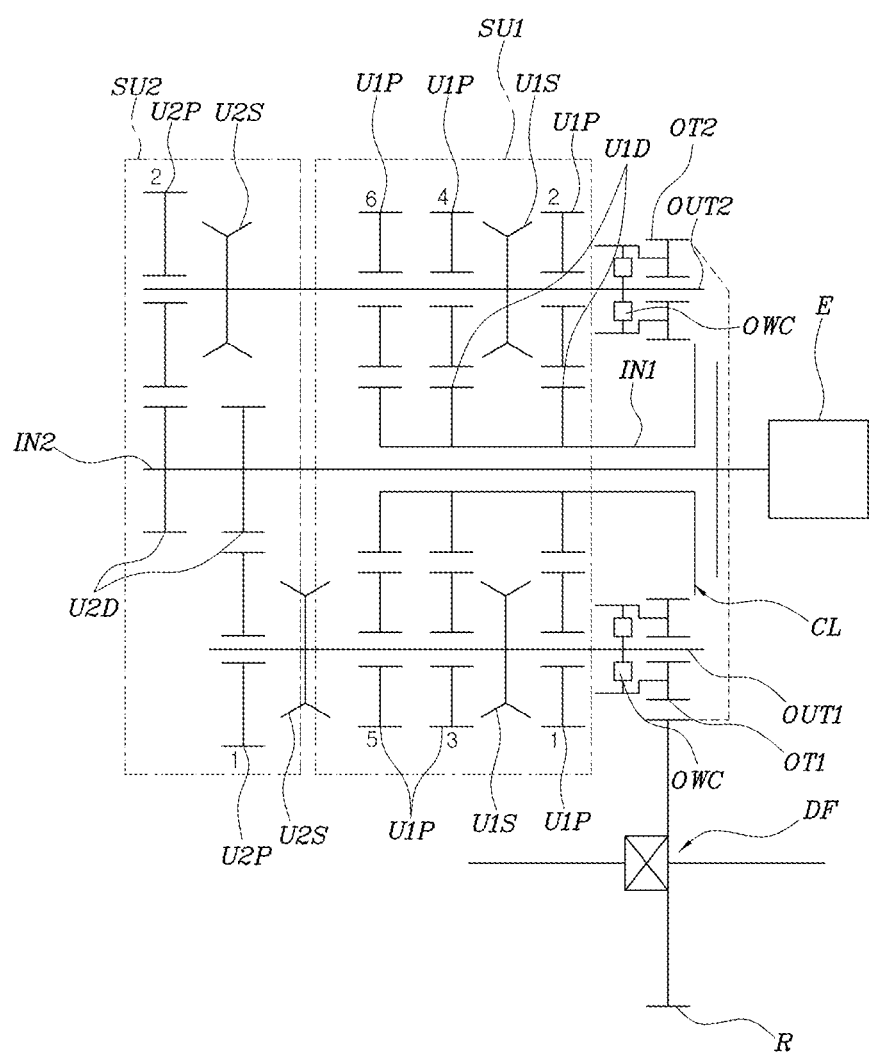

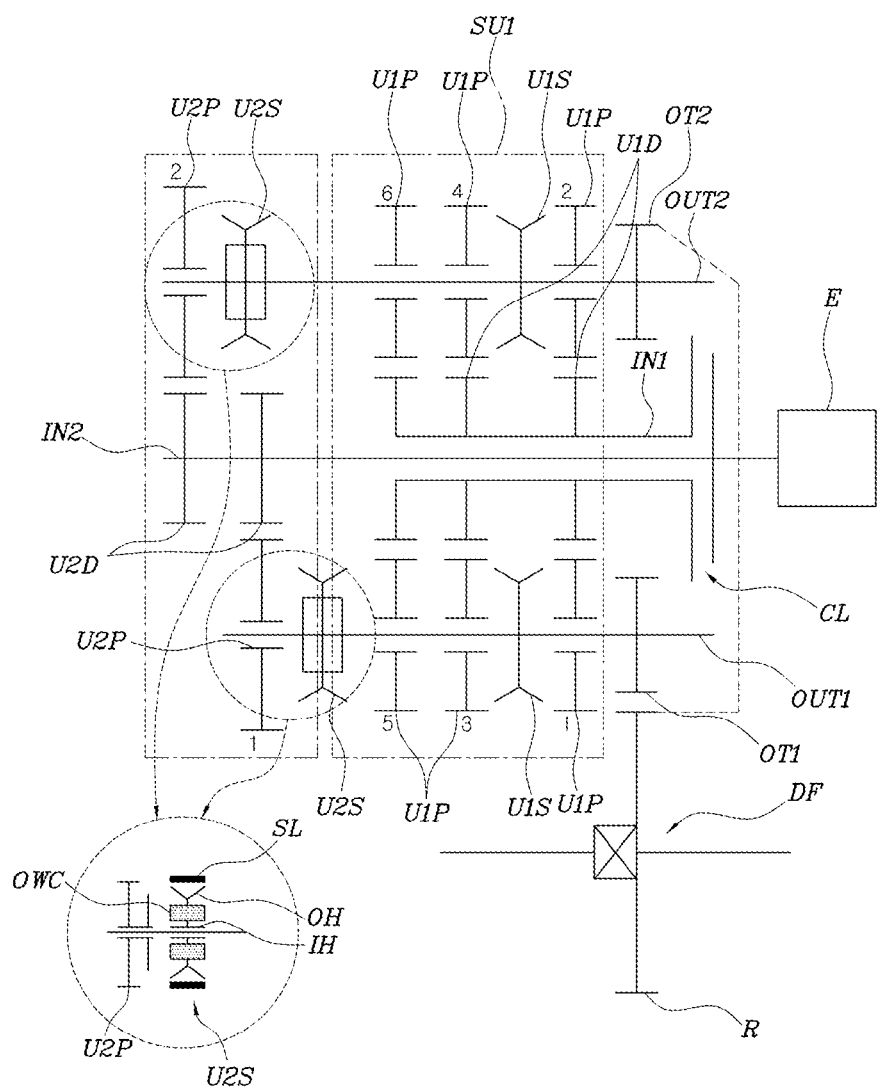
[Fig. 15]

[Fig. 16]
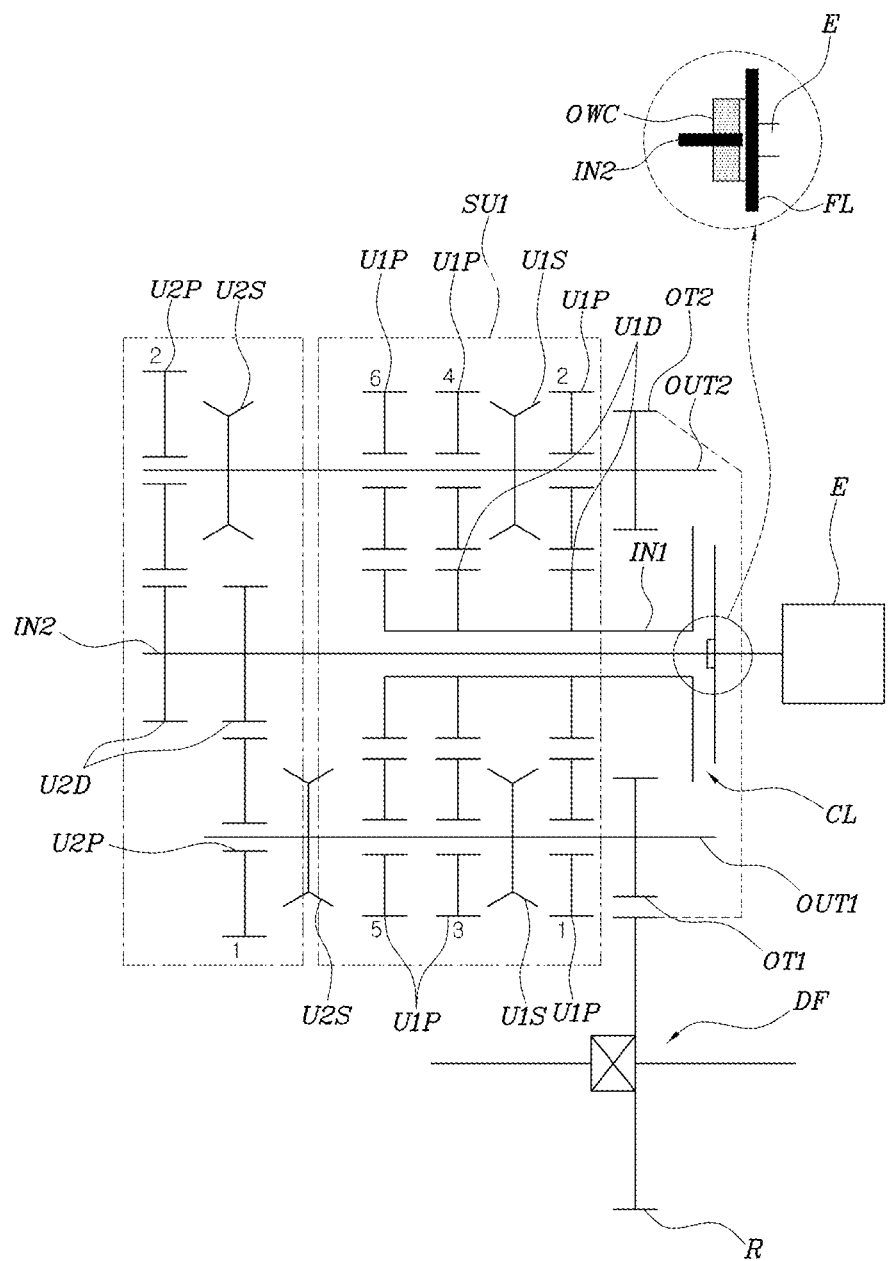

TRANSMISSION FOR VEHICLE

CROSS REFERENCE TO RELATED APPLICATION

The present application claims the benefit of Korean Patent Application Number 10-2015-0048872, filed on Apr. 7, 2015, which is hereby incorporated by reference herein in its entirety.

FIELD

The present disclosure relates to a transmission for a vehicle, and more particularly, to the configuration of a transmission that can automatically shift.

BACKGROUND

The statements in this section merely provide background information related to the present disclosure and may not constitute prior art.

In the related art, an AMT (Automated Manual Transmission) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, according to the AMT, it is required to cut torque from the clutch actuator to the AMT in order to disengage a previous shift gear and engage a new desired shift gear by operating the shift actuator. Such torque cut causes torque interruption that is supposed to be supplied to driving wheels from an engine so that smooth shifting and comfort riding deteriorates.

The foregoing is intended merely to aid in the understanding of the background of the present disclosure, and is not intended to mean that the present disclosure falls within the purview of the related art that is already known to those skilled in the art.

SUMMARY

The present disclosure provides a transmission for a vehicle that can inhibit or prevent deterioration of smooth shifting and comfort riding due to torque interruption in automated manual transmissions. The transmission can be more conveniently mounted on a vehicle in a relatively simple and compact configuration, and can contribute to improving fuel efficiency.

According to one aspect of the present disclosure, a transmission for a vehicle includes: a first input shaft selectively receiving power from an engine; a second input shaft continuously receiving power from the engine; a first output shaft arranged in parallel with the first input shaft and the second input shaft; a differential drawing power from the first output shaft and the second output shaft; a first shift unit making a series of desired gear shifts arranged between the first input shaft and the first output shaft, and between the first input shaft and the second output shaft; a second shift unit arranged between the second input shaft and the first output shaft, and between the second input shaft and the second output shaft, and configured to perform a series of duplicate gear shifts, each duplicate gear shift having a gear ratio substantially identical to at least one gear ratio of the desired gear shifts of the first shift unit; and a one-way clutch disposed in a power transmission line for transmitting power from the engine to the differential through the second shift unit and transmitting the power from the engine only to the differential.

According to the present disclosure, the transmission for vehicle can inhibit or prevent deterioration of smooth shifting and comfort riding caused by torque interruption, and the present disclosure provides a transmission having a relatively simple and compact configuration, and it can be easily mounted in a vehicle and can contribute to improving fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram showing the configuration of a transmission for a vehicle according to a first embodiment of the present disclosure;

FIGS. 2 to 5 are diagrams illustrating the operation of the transmission shown in FIG. 1 from a neutral state to a first gear-driving state;

FIGS. 6 to 9 are diagrams illustrating the operation of the transmission shown in FIG. 1 from the first gear-driving state to a second gear-driving state;

FIGS. 10 to 12 are diagrams illustrating the operation of the transmission shown in FIG. 1 from the second gear-driving state to a third gear-driving state;

FIG. 13 is a diagram showing a transmission for a vehicle according to a second embodiment of the present disclosure;

FIG. 14 is a diagram showing a transmission for a vehicle according to a third embodiment of the present disclosure;

FIG. 15 is a diagram showing a transmission for a vehicle according to a fourth embodiment of the present disclosure; and FIG. 16 is a diagram showing a transmission for a vehicle according to a fifth embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 13, and 16, transmissions for a vehicle according to embodiments of the present disclosure, in common, include: a first input shaft "IN1" that selectively receives power from an engine "E"; a second input shaft "IN2" that always receives power from the engine E; a first output shaft "OUT1" that is arranged in parallel with the first input shaft IN1 and the second input shaft IN2; a differential "DF" that draws power from the first output shaft OUT1 and the second output shaft "OUT2"; a first shift unit "SU1" that makes a series of desired gear shifts between the first input shaft IN1 and the first output shaft OUT1 or the second output shaft OUT2; a second shift unit "SU2" that makes a series of duplicate gear shifts, each duplicate gear shift having a gear ratio substantially identical to at least one gear ratio of the desired gear shifts of the first shift unit SU1, the gear shifts being arranged between the second input shaft IN2 and the first output shaft OUT1 and between the second input shaft IN2 and the second output shaft OUT2; and a one-way clutch "OWC" that is arranged in a power transmission line for transmitting power from the engine E to the differential DF through the second shift unit SU2 and transmits the power from the engine E only to the differential DF.

The transmission of the present disclosure has, other than a power transmission line transmitting the power to the differential DF through the first shift unit SU1, a power transmission line transmitting power from the engine E to the differential through the second shift unit SU2 with a gear ratio substantially identical to the gear ratio made by the first shift unit SU1, thus interlocking between the power transmitted through the first shift unit SU1 and the power transmitted through the second shift unit SU2 can be structurally prevented by the one-way clutch OWC.

The first input shaft IN1, which is a hollow shaft fitted arranged around the second input shaft IN2, is connected to the engine E through a clutch CL.

Assuming that the gear shifts made by the first shift unit SU1 are a series of gear shifts from a first gear shift having the largest gear ratio to an n-th gear shift, the duplicate gear shifts made by the second gear shift unit SU2 are a series of gear shifts from a first gear shift to a m-th gear shift (m≤n, n and m are natural numbers).

For example, if all of gear shifts required by a vehicle are from a first gear shift to a sixth gear shift, as in this embodiment, the first shift unit SU1 is configured to be able to make a total of six forward gear shifts from a first gear shift having the largest gear ratio to a sixth gear shift having the smallest gear ratio, so n is 6, and the second shift unit SU2 is configured to be able to make first and second duplicate gear shifts, so m is 2.

The reason of m≤n is that the duplicate gear shifts made by the second shift unit SU2 play a part in reducing or preventing torque interruption that is generated in shifting and the torque interruption influences smooth shifting and comfort riding when a vehicle is driven at a low speed with a relatively large gear ratio.

For example, if a vehicle has six forward gear shifts, the gear shifts where there is a problem with smooth shifting or comfort riding due to torque interruption while the vehicle is driven are typically the first gear shift to the third gear shift, but torque interruption does not often affect smooth shifting or comfort riding at higher gear shifts because the speed and the inertia of the vehicle are substantially high and large at those shifts. Accordingly, the second shift unit SU2 makes first and second duplicate gear shifts having the same or substantially identical gear ratios as those of low gear shifts of the first shift unit SU1 in order to improve torque interruption that may be generated at the first gear shift to the third gear shift.

In other form, the number of duplicate gear shifts that are made by the second shift unit SU2 may be increased or decreased in accordance with the design concept of a vehicle to be manufactured, but a plurality of duplicate gear shifts can be made sequentially from the gear shift having the largest gear ratio.

The first shift unit SU1 includes a plurality of first unit driving gears "U1D" arranged on the first input shaft IN1 for making all of gear shifts; a plurality of first unit driven gears "U1P" arranged on the first output shaft OUT1 and the second output shaft OUT2, respectively, for making gear shifts by engaging with the first unit driving gears U1D; and first unit synchronizers U1S arranged on the first output shaft OUT1 and the second output shaft OUT2, respectively, for allowing or preventing rotation of the first unit driven gears U1P with respect to the first output shaft OUT1 and the second output shaft OUT2.

The second shift unit SU2 includes: a plurality of second unit driving gears U2D arranged on the second input shaft IN2 for making the duplicate gear shifts; one or more second unit driven gears U2P arranged on the first output shaft OUT1 and the second output shaft OUT2, respectively, for making the duplicate gear shifts by engaging with the second unit driving gears U2D; and second unit synchronizers U2S arranged on the first output shaft OUT1 and the second output shaft OUT2, respectively, for allowing or preventing rotation of the second unit driven gears U2P with respect to the first output shaft OUT1 and the second output shaft OUT2.

The second unit synchronizers U2S arranged on the first output shaft OUT1 can allow or inhibit rotation of the second unit driven gear U2P with respect to the first output shaft OUT1, at the left side, and can allow or inhibit the first unit driven gear U1P with respect to the first output shaft OUT1 for making the fifth gear shift of the first shift unit SU1, at the right side, so the right side pertains to the first unit synchronizer U1S and the left side pertains to the second unit synchronizer U2S.

In other form, this configuration reduces necessary synchronizers, so the number of parts, the weight, and the entire length of the transmission are reduced.

This configuration is the same in the first embodiment as shown in FIG. 1, the second embodiment as shown in FIG. 13, the third embodiment as shown in FIG. 14, the fourth embodiment as shown in FIG. 15, and the fifth embodiment as shown in FIG. 16, and the first to fifth embodiments are different in the position of the own-way clutch OWC.

In the first embodiment as shown in FIG. 1, the one-way clutch OWC transmits power only from the second input shaft IN2 to the second unit driving gears U2D, being arranged between the second input shaft IN2 and the second unit driving gears U2D.

In the second embodiment as shown in FIG. 13, the one-way clutch OWC transmits power from the second unit driven gear U2P only to the second unit synchronizer U2S, being arranged between the second unit driven gear U2P and the second unit synchronizer U2S.

In the second embodiment, the second unit driven gear U2P includes a shift gear U2P-1 substantially generating a gear ratio by engaging with the second unit driving gear U2D and a clutch gear U2P-2 connected to or disconnected from the second unit synchronizer U2S by engaging with or disengaging from the second unit synchronizer U2S, and the one-way clutch OWC is arranged between the shift gear U2P-1 and the clutch gear U2P-2 and transmits power only from the shift gear U2P-1 to the clutch gear U2P-2.

In this case, the shift gear U2P-1 and the clutch gear U2P-2, unlike a common case of the related art, are rotatably separated from each other or connected to each other by the one-way clutch OWC.

In the third embodiment as shown in FIG. 14, a first output gear OT1 transmitting power to a differential DF by engaging with a ring gear R of the differential DF is arranged on the first output shaft OUT1, a second output gear OT2 transferring power to the differential DF by engaging with the ring gear R of the differential DF is arranged on the second output shaft OUT2, and one-way clutches OWC are arranged between the first output shaft OUT1 and the first output gear OT1 and between the second output shaft OUT2 and the second output gear OT2.

Accordingly, power from the first output shaft OUT1 is transmitted to the first output gear OT1 through the one-way clutch OWC between the first output shaft OUT1 and the first output gear OT1 and power from the second output shaft OUT2 is transmitted to the second output gear OT2 through the one-way clutch OWC between the second output shaft OUT2 and the second output gear OT2. As a result, power is transferred to the differential DF and is not transmitted to the first output shaft OUT1 or the second output shaft OUT2 from the differential DF.

In the fourth embodiment as shown in FIG. 15, a hub of the second unit synchronizer U2S comprises an inner hub IH fitted on the first output shaft OUT1 or the second output shaft OUT2 and an outer hub OH arranged outside the inner hub IH to rotate relative to the inner hub IH and supporting a sleeve SL.

A one-way clutch OWC is arranged between the outer hub OH and the inner hub IH to transmit power only from the outer hub OH to the inner hub IH.

Accordingly, when the sleeve of the second unit synchronizer on the first output shaft is engaged with the second unit driven gear for a duplicate first gear shift, power from the engine is transmitted to the outer hub through the sleeve and then transmitted to the inner hub through the one-way clutch, so the power reaches the first output shaft and the first output gear.

In the fifth embodiment as shown in FIG. 16, a one-way clutch OWC is arranged between a flywheel FL and a second input shaft IN2 to transmit power only to the second input shaft IN2 from the flywheel FL of the engine E.

As can be seen in common from the first to fifth embodiments, the one-way clutch OWC transmits power from the engine E to the differential DF through the second shift unit SU2, not in the opposite direction, so interlock between the power transmitted from the engine E to the differential DF through the second shift unit SU2 and the power transmitted to the differential DF through the first shift unit SU1 is structurally prevented and power can be transmitted through the second shift unit SU2 only when power can be transmitted to the differential DF through the second shift unit SU2 without interlock of the power.

The operation of the first embodiment of the present disclosure which has the configuration described above is described with reference to FIGS. 1 to 12.

FIG. 1 shows a neutral state, in which the first unit synchronizers U1S and the second unit synchronizers U2S are in a neutral state, so the engine E can be started regardless of whether the clutch CL is engaged or disengaged, but the clutch CL has been disengaged in FIG. 1.

When the engine E is started in the state of FIG. 1, the first gear shift is made by the first shift unit SU1, as in FIG. 2, and then the clutch CL is engaged, as shown in FIG. 3, the power from the engine E is shifted through the first shift unit SU1 and transferred to the differential DF through the first output shaft OUT1 and the first output gear OT1, so the vehicle is started at the first gear shift.

After the vehicle is started in the state as shown in FIG. 3, the second shift unit SU2 makes a first gear shift in duplicate, as shown in FIG. 4. Accordingly, in this state, the power from the engine E is transferred to the first output shaft OUT1 through both of the first shift unit SU1 and the second shift unit SU2.

In the state shown in FIG. 5, the first gear shift made by the first shift unit SU1 requires to be shifted to the neutral to prepare for shifting to the second gear shift, in which, similarly, the power from the engine E is continuously supplied to the first output shaft OUT1 with the first gear shift made by the second shift unit SU2.

FIG. 6 shows a state when the clutch CL has been disengaged and the first shift unit SU1 has made the second gear shift from the state of FIG. 5, in which, similarly, the second input shaft IN2 directly receives the power from the engine E regardless of whether the clutch CL is disengaged or not, so the output at the first gear shift by the second shift unit SU2 is continuously transmitted to the differential DF through the first output shaft OUT1.

FIG. 7 shows shifting to the second gear shift by engaging the clutch CL from the state of FIG. 6, in which power transmitted through the clutch CL starts to be supplied to the differential through the second output shaft OUT2, with the gear ratio of the second gear shift through the first shift unit SU1.

The power shifted for the second gear shift through the first shift unit SU1 is transmitted back to the first output shaft OUT1 from the differential DF, but is blocked by the one-way clutch OWC between the second unit driving gear U2D and the second input shaft IN2, so it does not interlock the power from the second input shaft IN2.

Accordingly, in this state, the vehicle is driven by the power at the first gear shift through the second shift unit SU2, and when the clutch CL is engaged, the power is shifted directly to the second gear shift through the first shift unit SU1 without torque interruption, so shifting is smoothly performed and comfort riding is improved.

In the state shown in FIG. 8, the second shift unit SU2 makes a second gear shift from the state as shown in FIG. 7, so power from the engine E is transmitted to the first output shaft OUT1 and the second output shaft OUT2 through both of the first shift unit SU1 and the second shift unit SU2 and power shifted with the gear ratio of the second gear shift is transmitted to the ring gear R of the differential DF through both of the first output shaft OUT1 and the second output shaft OUT2.

FIG. 9 shows a state when the second gear shift by the first shift unit SU1 is disengaged from the state of FIG. 8, in which preparing for shifting to the third gear shift is performed, and similarly, the power from the engine E is transferred with the gear ratio of the second gear shift to the second output shaft OUT2 through the second shift unit SU2.

FIG. 10 shows a state in which the clutch CL is disengaged and a third gear shift is engaged by the first shift unit SU1. In this case, similarly, power from the engine E is transmitted through the second shift unit SU2 and the second output shaft OUT2, so the vehicle keeps being driven at the second gear shift. When the clutch CL is engaged, as shown in FIG. 11, shifting to the third gear shift can be achieved without torque interruption.

FIG. 12 shows a state of preparing for the next shifting by disengaging the second gear shift by the second shift unit SU2, in which shifting to the fourth to the sixth gear shifts is performed, similar to the related art, by disengaging the clutch CL only with the first shift unit SU1, disengaging the previous gear shift, engaging the desired gear shift, and the engaging the clutch CL.

Accordingly, in the shifting to the fourth to the sixth gear shifts, although torque interruption is generated, as in the related art, but they are higher gear shifts, it does not influence smooth shifting and comfort riding, as described above.

The second to fifth embodiments are operated in almost the same way as the first embodiment, so they are not described in detail.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A transmission for a vehicle, comprising:
   a first input shaft selectively receiving power from an engine;
   a second input shaft continuously receiving power from the engine;
   a first output shaft arranged in parallel with the first input shaft and the second input shaft;
   a differential drawing power from the first output shaft and a second output shaft;
   a first shift unit arranged between the first input shaft and the first output shaft, and between the first input shaft and the second output shaft, and configured to perform a series of desired gear shifts there between;
   a second shift unit arranged between the second input shaft and the first output shaft, and between the second input shaft and the second output shaft, and configured to perform a series of duplicate gear shifts there between, each duplicate gear shift having a gear ratio substantially identical to at least one gear ratio of the desired gear shifts of the first shift unit; and
   one or more one-way clutches arranged in a power transmission line for transmitting power from the engine to the differential through the second shift unit and configured to transmit the power from the engine to the differential through the one-way clutches,
   wherein the first input shaft is a hollow shaft fitted around the second input shaft and connected to the engine through a clutch,
   wherein among the gear ratios of the desired gear shifts performed by the first shift unit and of the duplicate gear shifts, a largest gear ratio of the gear shifts of the first shift unit is substantially identical to a largest gear ratio of the duplicate gear shifts, and
   wherein a lowest gear ratio of the duplicate gear shifts is larger than a lowest gear ratio of the gear shifts of the first shift unit.

2. The transmission according to claim 1, wherein the first shift unit further comprises:
   a plurality of first unit driving gears arranged on the first input shaft and configured to make the series of gear shifts;
   a plurality of first unit driven gears arranged on the first output shaft and the second output shaft configured to make the series of gear shifts by engaging with the first unit driving gears; and
   first unit synchronizers configured to allow or inhibit rotation of the first unit driven gears with respect to the first output shaft and the second output shaft, the first unit synchronizers arranged on the first output shaft and the second output shaft.

3. The transmission according to claim 1, wherein the second shift unit further comprises:
   a plurality of second unit driving gears arranged on the second input shaft and configured to make the series of duplicate gear shifts;
   one or more second unit driven gears configured to make the series of duplicate gear shifts by engaging with the second unit driving gears, the second unit driven gears arranged on the first output shaft and the second output shaft; and
   second unit synchronizers configured to allow or inhibit rotation of the second unit driven gears with respect to the first output shaft and the second output shaft, the second unit synchronizers arranged on the first output shaft and the second output shaft.

4. The transmission according to claim 3, wherein the one-way clutches transmit power only from the second input shaft to the second unit driving gears, being arranged between the second input shaft and the second unit driving gears.

5. The transmission according to claim 3, wherein the one-way clutches transmit power only from the second unit driven gears to the second unit synchronizers, being arranged between the second unit driven gears and the second unit synchronizers.

6. The transmission according to claim 5, wherein the second unit driven gears include a shift gear substantially generating a gear ratio by engaging with one of the second unit driving gears and a clutch gear connected to or disconnected from one of the second unit synchronizers by engaging with or disengaging from the one of the second unit synchronizers, and
   at least one of the one-way clutches is arranged between the shift gear and the clutch gear and transmits power only from the shift gear to the clutch gear.

7. The transmission according to claim 3, wherein a first output gear configured to transmit power to the differential by engaging with a ring gear of the differential is arranged on the first output shaft,
   a second output gear configured to transmit power to the differential by engaging with the ring gear of the differential is arranged on the second output shaft, and
   the one-way clutches include a first one-way clutch arranged between the first output shaft and the first output gear, and a second one-way clutch arranged between the second output shaft and the second output gear.

8. The transmission according to claim 3, wherein a hub of the second unit synchronizers comprises:
   an inner hub fitted on the first output shaft or the second output shaft; and
   an outer hub arranged outside the inner hub to rotate relative to the inner hub and supporting a sleeve, and
   wherein at least one of the one-way clutches is arranged between the outer hub and the inner hub to transmit power only to the inner hub from the outer hub.

9. The transmission according to claim 3, wherein the one-way clutches are arranged between a flywheel and the second input shaft to transmit power only to the second input shaft from the flywheel of the engine.

10. The transmission according to claim 1, wherein the series of gear shifts performed by the first shift unit include a number N of gear shifts, and wherein the series of duplicate gear shifts performed by the second shift unit include a number M of gear shifts, and wherein M<=N.

* * * * *